United States Patent [19]

Tsutsui

[11] Patent Number: 4,957,328
[45] Date of Patent: Sep. 18, 1990

[54] HUB UNIT

[75] Inventor: Takashi Tsutsui, Osaka, Japan

[73] Assignee: Koyo Seiko Co., Ltd., Osaka, Japan

[21] Appl. No.: 323,782

[22] Filed: Mar. 15, 1989

[30] Foreign Application Priority Data

Mar. 18, 1988 [JP] Japan .............................. 63-37060[U]

[51] Int. Cl.$^5$ .............................................. B60B 27/00
[52] U.S. Cl. .............................. 301/105 R; 301/124 R
[58] Field of Search ................... 301/105 R, 111, 112, 301/114, 118, 122, 124 R, 126, 131, 132

[56] References Cited

U.S. PATENT DOCUMENTS

| 546,176 | 9/1895 | Miller | 301/118 |
|---|---|---|---|
| 781,803 | 2/1905 | Belfield et al. | 301/118 |
| 3,594,051 | 7/1971 | Wells | 308/191 |
| 4,179,167 | 12/1979 | Lura et al. | 308/189 A |
| 4,381,874 | 5/1983 | Strader | 301/126 X |
| 4,786,115 | 11/1988 | Asberg | 301/124 R |

FOREIGN PATENT DOCUMENTS 2082989  3/1982  United Kingdom ............ 301/105 R

Primary Examiner—Russell D. Stormer
Attorney, Agent, or Firm—Wenderoth, Lind & Ponack

[57] ABSTRACT

A hub unit having an outer ring member; an inner ring member a flange part, a large diameter part, and a small diameter part which has an outer circumference channel extending circumferentially in an end of the small diameter part and multiple notches which open the outer circumference channel to the end surface of the small diameter part; a sleeve which fits over the small diameter part of the inner ring member, one end of which contacts a shoulder between the large diameter part and the small diameter part and the other end of which overhangs the outer circumference channel; multiple rolling elements positioned at regular intervals between the outer ring member and the large diameter part of the inner ring member and between the outer ring member and the sleeve; and a ring-shaped bayonet member having multiple engaging parts which respectively project radially inward at positions corresponding to the positions of the notches. The engaging parts are inserted through the notches and fit within the outer circumference channel such that when these engaging parts are fit in the outer circumference channel, the bayonet member presses the end of the sleeve toward the shoulder, the bayonet member being thus pressed against the wall defining the outer circumference channel and locked.

6 Claims, 4 Drawing Sheets

HUB UNIT

BACKGROUND OF THE INVENTION

The present invention relates to a hub unit to be used in the wheels of an automobile, etc.

A conventional hub unit of this type is provided with an outer ring member, an inner ring member which has a large diameter part and a small diameter part, said small diameter part having a threaded end, a sleeve which fits over the small diameter part of the inner ring, and rolling elements which are positioned between the large diameter part of the inner ring member and the inner surface of the outer ring member and between the outer surface of the sleeve and the inner surface of the outer ring member. The sleeve is tightened by screwing a nut on the threaded end toward a step between the large and small diameter parts of the inner ring member and caulking such a fitting.

However, because the sleeve is tightened and fixed to the inner ring member by a nut, the conventional hub unit is not able to secure the sleeve without turning the nut a certain number of revolutions, thus being disadvantageous in that the time required for assembling the hub unit is long. Furthermore, with the conventional hub unit, there is the additional problem that the tightening torque of the nut must be strictly controlled. Moreover, because threads must be provided on the inner ring member, there is the additional problem that the size of the overall hub unit is relatively large in the axial direction.

SUMMARY OF THE INVENTION

Therefore, the object of the present invention is to provide a hub unit in which the sleeve can be positively secured to the inner ring member in a confined space and with a single action.

To achieve the above object, a hub unit according to the present invention is characterized by comprising an outer ring member; an inner ring member comprised of a flange part to which is mounted a wheel, a large diameter part, and a small diameter part which has an outer circumference channel extending circumferentially in an end of the small diameter part and multiple notches which open the outer circumference channel to the end surface of the small diameter part; a sleeve which fits over the small diameter part of the inner ring member, one end of which contacts a shoulder between the large diameter part and the small diameter part of the inner ring member and the other end of which overhangs the outer circumference channel; multiple rolling elements positioned at regular intervals between the inner circumferential surface of the outer ring member and the outer circumferential surface of the large diameter part of the inner ring member and between the inner circumferential surface of the outer ring member and the outer circumferential surface of the sleeve; and a ring-shaped bayonet member having multiple engaging parts which respectively project radially inwardly at positions corresponding to the positions of the notches in the inner ring member, said engaging parts insertable through the notches in the inner ring member and fitting within the outer circumference channel such that when these engaging parts are fit in the outer circumference channel, said bayonet member presses the end of the sleeve toward said shoulder, and said bayonet member is pressed against the wall defining the outer circumference channel and locked.

A hub unit having the aforementioned elements is assembled as described below.

The sleeve is fit on the small diameter part of the inner ring member, and the rolling elements are inserted between the inner ring member and the outer ring member and between the sleeve and the outer ring member. Then, the engaging parts extending radially inwardly of the ring-shaped bayonet member are aligned with the multiple notches which open the outer circumference channel to the end face of the small diameter part of the inner ring member, and are axially inserted into the outer circumference channel. Then, the bayonet member is rotated a fraction of a revolution. Thus, the engaging parts move in the circumferential direction, fitting between the face defining the outer circumference channel and the axially inner end of the sleeve, pressing the sleeve toward the shoulder between the large and small diameter parts of the inner ring member, and are stopped at the face. At this time, because the wall thickness of the engaging part of the bayonet member is greater by a specified amount than the difference between the distance from the shoulder to the axially inner end of the sleeve and the distance from the shoulder to the face defining the axially inner side of the outer circumference channel, the sleeve is pressed against the shoulder and is secured by pressure of a specified amount generated by the bayonet member.

As will be apparent from the above description, a hub unit according to the present invention is able to positively and easily lock a sleeve with a simple single-action by simply rotating a bayonet member a fraction of a revolution and without rotating said member several revolutions as with a conventional hub unit. And, because the hub unit is secured with the bayonet member, the size of the hub unit in the axial direction can be smaller compared with conventional devices employing a thread.

BRIEF DESCRIPTION OF THE DRAWINGS

The present invention will become more fully understood from the detailed description given hereinbelow and the accompanying drawings which are illustrative only, and thus are not limitative, of the present invention, and wherein.

DETAILED DESCRIPTION OF THE PREFERRED EMBODIMENTS

Figure 1:
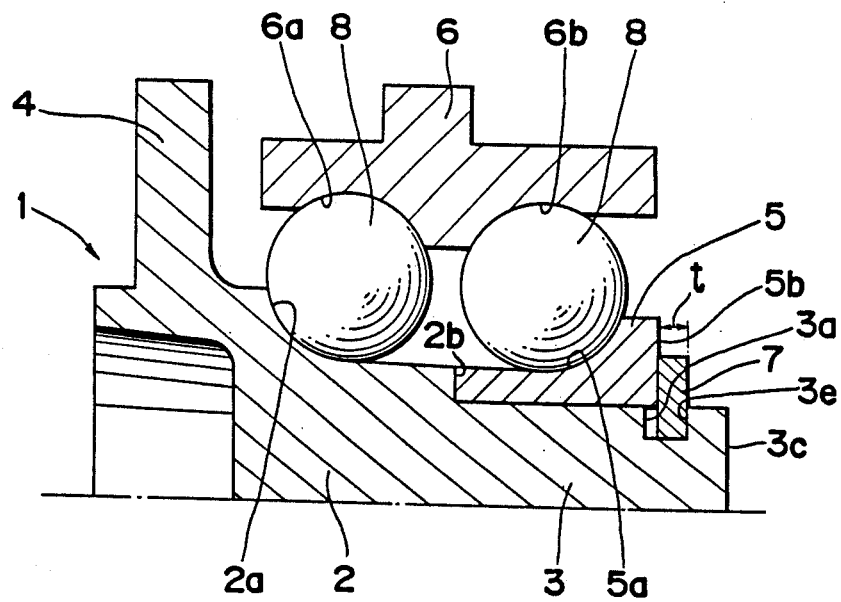
FIG. 1 is a half cross-sectional view of a preferred embodiment of a hub unit according to the present invention.

In FIG. 1, reference number 1 designates an inner ring member which has a large diameter part 2, a small diameter part 3, and a flange 4. To the flange 4 is mounted a wheel using bolts and nuts, these being not shown in the figure. At the outer circumference of the large diameter part 2 is provided a raceway surface 2a which in cross section has an arcuate shape. Furthermore, to the small diameter part 3 is fit a sleeve 5 which has a raceway surface 5a extending from the raceway surface 2a and is a ring which in cross section is L-shaped. Balls 8 serving as rolling elements are provided circumferentially in two rows respectively located between the two raceways 6a, 6b provided in the inner circumference of outer ring member 6 and raceway surface 5a in sleeve 5 and raceway surface 2a in the large diameter part 2.

Figure 2:
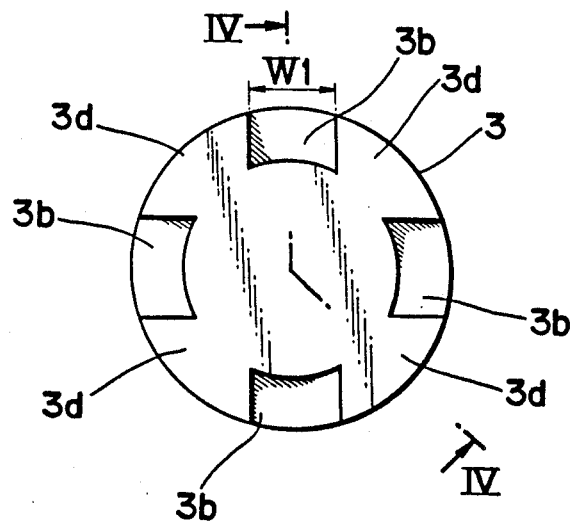
FIG. 2 is a front view of the small diameter part shown in FIG. 1.
Figure 3:
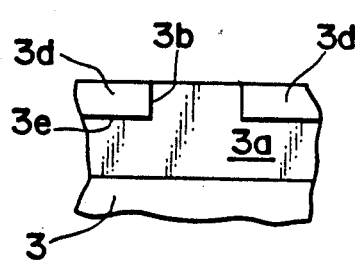
FIG. 3 is a partial top view of the small diameter part shown in FIG. 2.
Figure 4:
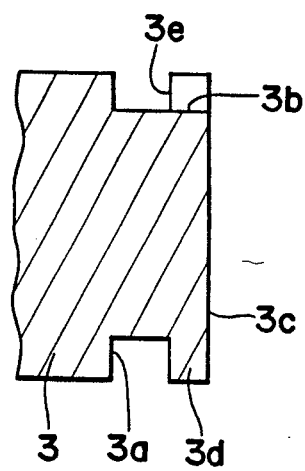
FIG. 4 is a sectional view taken along line IV—IV in FIG. 2.

An outer circumference channel 3a having a rectangular cross section is provided at the end of small diameter part 3 of the inner ring member 1. As shown in FIG. 2, notches 3b each having a width W1 and open to the end 3c of the small diameter part 3 divide this outer circumference channel 3a into four equal parts spaced circumferentially at 90 degree intervals. Thus, the end of small diameter part 3 defines four abbreviated fan-shaped engaging parts 3d located 90 degrees apart from one another.

Figure 6:
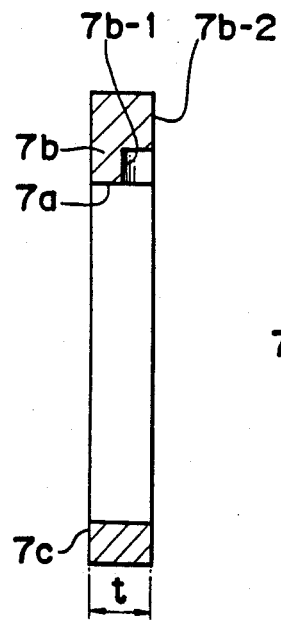
FIG. 6 is a sectional view taken along line VI—VI in FIG. 5.
Figure 5:
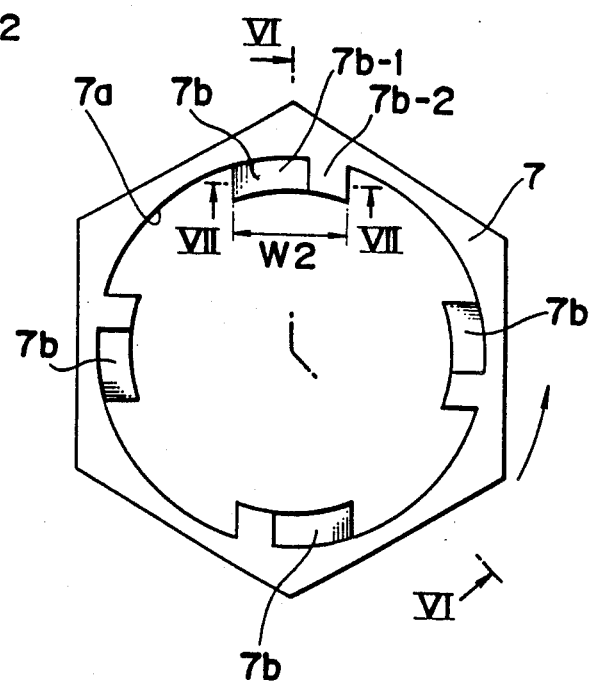
FIG. 5 is a front view of the bayonet member shown in FIG. 1.
Figure 7:
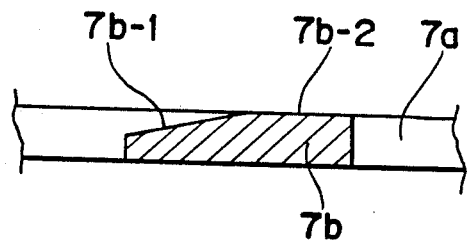
FIG. 7 is a sectional view taken along line VII—VII in FIG. 5.

As shown in FIGS. 5 and 6, a bayonet member 7, which is flat, hexagonal, defines a center hole 7a and which has four engaging parts 7b facing inwardly and spaced radially apart at 90 degree intervals, is mounted to the ring member within the outer circumference channel 3a. The diameter of the hole 7a in this bayonet member 7 is slightly larger than the diameter of small diameter part 3 in the inner ring member 1. The four engaging parts 7b in the bayonet member 7 each have a width W2 which is slightly smaller than width W1 of notches 3b in the end of the inner ring member 1, and the diameter of the imaginary circle formed by connecting the inside tips of the engaging parts 7b is slightly larger than the diameter of the ring member 1 as taken at the bottom of outer circumference channel 3a. As shown in FIG. 7, one side of the engaging part 7b is provided with a tapered portion 7b-1 which gradually becomes thinner to the left side of the figure, and a parallel portion 7b-2 which has a uniform thickness. The bayonet member 7 is mounted to small diameter part 3 by this tapered portion 7b-1 when engaging parts 7b are inserted between the axially inner end 5b of sleeve 5 and the side of notches 3b of outer circumference channel 3a as will be explained hereinafter.

The wall thickness t of the bayonet member 7 is greater by a specified amount than the difference between the distance from shoulder 2b between the large diameter part 2 and small diameter part 3 to the axially inner end 5b of sleeve 5, and the distance from the shoulder 2b to the face 3e of the ring member defining the axially inner side of the outer circumference channel 3a. Thus, when the bayonet member 7 is mounted to the ring member in the outer circumference channel 3a, said sleeve 5 is pressed toward the shoulder 2b by the bayonet member 7.

A hub unit having the aforementioned elements is assembled as described below.

Figure 8:
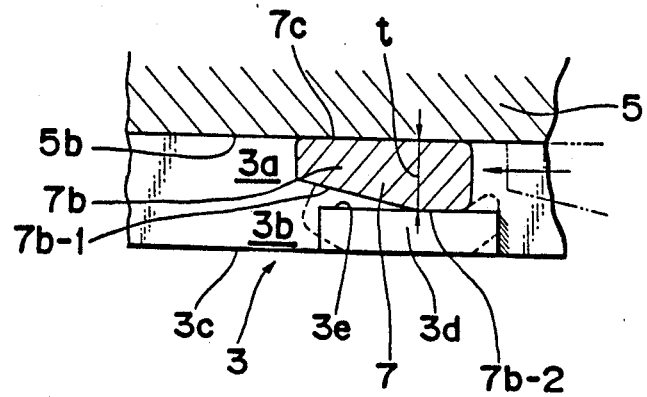
FIG. 8 is an explanatory diagram illustrating the state in which the sleeve is locked by the bayonet member according to the present invention.

First, the first row of balls 8 is placed between raceway surface 2a of the outer circumference of large diameter part 2 of inner ring member 1 and raceway 6a on the inner circumference of outer ring member 6. Next, sleeve 5 is fit over small diameter part 3 of inner ring member 1, and the second row of balls 8 is placed between raceway surface 5a on the outer circumference of sleeve 5 and the other raceway 6b of the outer ring member 6. Next, sleeve 5 is then pressed in until the end of sleeve 5 abuts shoulder 2b. Next, with face 7c, which is the side opposite the inclined surface of tapered portion 7b-1, facing the sleeve 5, bayonet member 7 is positioned so that the four engaging parts 7b protruding radially inwardly are aligned with the fourth notches 3b which open the outer circumference channel 3a to the end face 3c of the small diameter part 3. And then, the bayonet member 7 is pressed in the axial direction until the face 7c contacts axially the inner end 5b of the sleeve 5. At this time, because the width W2 of engaging parts 7b of the bayonet member 7 is smaller than width W1 of the notches 3b, and the diameter of hole 7a is greater than the diameter of the small diameter part 3, and moreover the diameter of the imaginary circle connecting the inner end of engaging parts 7b is larger than the diameter of the ring member taken at the bottom of the notches 3b and that of the ring member taken at the bottom of outer circumference channel 3a contiguous to notches 3b, bayonet member 7 can be smoothly inserted. Next, as shown in FIG. 8, with face 7c in contact with the axially inner end 5b of sleeve 5, using a hexagon wrench, bayonet member 7 is turned counterclockwise toward end 3c of small diameter part 3 as shown by the arrow. Thus, because engaging parts 7b of bayonet member 7 have tapered portions 7b-1 as previously described, said engaging parts 7b are pressed like a wedge from the thin end between the axially inner end 5b of the sleeve 5 and the face 3e of outer circumference channel 3a provided in the end of small diameter part 3, that is, the face 3e on the axially outer side of semi-fan shaped part 3d. The three engaging parts 7b are simultaneously pressed under a wedge effect. When the uniform thickness portion 7b-2 of engaging parts 7b are turned substantially to the center, in the circumferential direction of semi-fan shaped parts 3d (see FIG. 8), the rotation of the bayonet member 7 in the counterclockwise direction by the hexagon wrench is stopped. At this time, the engaging parts 7b are completely mounted to the small diameter part 3. Thus, because the lock is completed by rotating the bayonet member 7 a fraction of a revolution as with the mounting of a single lens reflex camera lens, there is no need to turn the bayonet member as when accomplishing locking with a nut as in conventional devices. At this time, the sleeve 5 is pressed with a specific force in the direction of shoulder 2b between the small diameter part 3 and the large diameter part 2 of inner ring member 1 by the bayonet member 7. When the locking of sleeve 5 is completed, the four semi-fan shaped parts 3d on the end of inner ring member 1 are finally caulked from both sides in the circumferential direction as shown by the dotted line in FIG. 8 so that the engaging parts 7b of the bayonet member 7 do not move, thus completing the installation.

Figure 9:
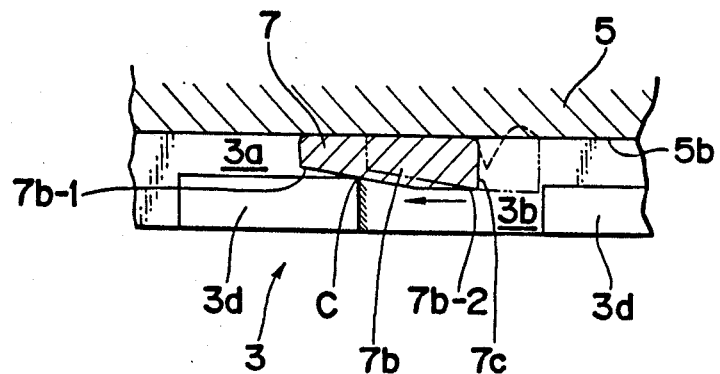
FIG. 9 and FIG. 10 are similar views illustrating alternative designs of the engaging part in the present invention.
Figure 10:
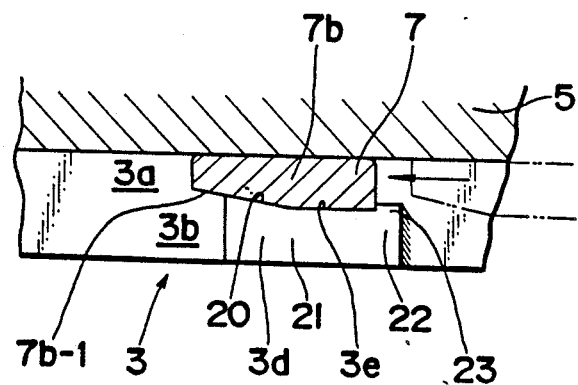

In a preferred embodiment according to the present invention as heretofore described, the bayonet member 7 is turned until uniform thickness portion 7b-2 of engaging parts 7b is completely between end surfaces 5b of sleeve 5 and face 3e defining the outer circumference channel 3a at the axially outer side of semi-fan shaped parts 3d on small diameter part 3. However, in another embodiment as shown by the dotted line in FIG. 9, the bayonet member 7 is rotated until a specific location on each tapered portion 7b-1 of engaging parts 7b of bayonet member 7 abuts corner C of the fan shaped part 3d, and the end face 5b of sleeve 5 near the parallel portion 7b-2 of engaging parts 7b is caulked and the sleeve 5 completely locks the bayonet member 7 so that it prevents bayonet member 7 from backing up. Furthermore, as shown in FIG. 10, it is also possible to provide a face 20 flush with tapered portion 7b-1 of bayonet member 7 at the outer circumference channel 3a side of semi-fan shaped parts 3d on the end of small diameter part 3, and a projection 23 extending axially outwardly on end 22 of a semi-fan shaped part 21 such that engaging parts 7b of bayonet member 7 inserted in the direction of the arrow cannot rotate in the direction opposite that of the arrow.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hub unit comprising:
   an outer ring member;
   an inner ring member including a flange part to which a wheel is to be mounted, a large diameter part, a small diameter part which has an outer circumference channel extending circumferentially in an end thereof and a plurality of notches defined therein which open the outer circumference channel to an end surface of the small diameter part, and a shoulder defined between said large and said small diameter parts;
   a sleeve disposed over the small diameter part of the inner ring member, one end of the sleeve contacting said shoulder, and the other end of said sleeve overhanging the outer circumference channel when said sleeve is disposed over said small diameter part with said one end thereof abutting said shoulder;
   a plurality rolling elements positioned at regular intervals between the inner circumferential surface of said outer ring member and the outer circumferential surface of said large diameter part of the inner ring member and between the inner circumferential surface of said outer ring member and the outer circumferential surface of said sleeve;
   a ring-shaped bayonet member having a plurality of engaging parts which respectively project radially inwardly at positions corresponding to the positions of said notches defined in the inner ring member, each of said engaging parts having a tapered portion, each of said engaging parts being insertable through a respective one of said notches,
   said ring-shaped bayonet member having a portion thereof extending between, in a thickness-wise direction thereof, and contacting a surface of said inner ring member defining a side of said circumference channel and said other end of said sleeve,
   said portion of the ring-shaped bayonet member including a portion of each of said engaging elements which contacts said surface of said ring member defining said side of said circumference channel, and
   said portion of the ring-shaped bayonet member having a preassembly thickness greater than the difference between the distance from said shoulder to said surface of said inner ring member defining said side of said circumference channel and the distance from said shoulder to said other end of said sleeve, when said sleeve is disposed over said small diameter part prior to assembly of said bayonet member with said one end thereof abutting said shoulder, such that said bayonet member presses said sleeve against said shoulder and is in turn wedged between said sleeve and said surface defining said side of said circumference channel.

2. A hub unit as claimed in claim 1, and further comprising rotation preventing means engaging said engaging elements for preventing said bayonet member from rotating while wedged between said sleeve and said surface defining said side of said circumference channel.

3. A hub unit as claimed in claim 2, wherein said rotation preventing means is caulking disposed between and securing said engaging elements and said inner ring member.

4. A hub unit as claimed in claim 2, wherein said rotation preventing means is caulking disposed between and securing said engaging elements and said sleeve.

5. A hub unit as claimed in claim 2, wherein said rotation preventing means includes projections integral with said inner ring member and projecting into said circumference channel at said surface defining said side of said circumference channel.

6. A hub unit as claimed in claim 5, wherein said rotation preventing means also includes tapered portions integral with said inner ring member and defining respective inclined faces extending into said circumference channel from said surface defining said side of said circumference channel, said inclined faces abutting the tapered portion of each of said engaging parts, respectively.

* * * * *